United States Patent
Giavelli et al.

(10) Patent No.: US 10,908,826 B2
(45) Date of Patent: Feb. 2, 2021

(54) CONTROLLING ACCESS TO MEMORY CELLS

(71) Applicant: salesforce.com, inc., San Francisco, CA (US)

(72) Inventors: Luc Marcel Giavelli, San Francisco, CA (US); Joshua James Luft-Glidden, San Francisco, CA (US); Radhika Nair, San Francisco, CA (US); Fabrice Talbot, San Francisco, CA (US); Srinivasa Gopaladasu, San Francisco, CA (US); Venkata Kolla, San Francisco, CA (US); Lucas Pfister, Millbrae, CA (US); Chintan Tank, Dublin, CA (US); Chaitanya Bhatt, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 173 days.

(21) Appl. No.: 16/139,162

(22) Filed: Sep. 24, 2018

(65) Prior Publication Data
US 2020/0097193 A1    Mar. 26, 2020

(51) Int. Cl.
*G06F 3/06*    (2006.01)

(52) U.S. Cl.
CPC ............ *G06F 3/0622* (2013.01); *G06F 3/067* (2013.01); *G06F 3/0637* (2013.01); *G06F 3/0644* (2013.01); *G06F 3/0659* (2013.01)

(58) Field of Classification Search
CPC ...... G06F 3/0637; G06F 3/067; G06F 3/0644; G06F 3/0659
See application file for complete search history.

(56) References Cited

U.S. PATENT DOCUMENTS

| 6,041,394 A * | 3/2000 | Halligan | G06F 3/0623 711/114 |
| 7,076,649 B2 * | 7/2006 | Hagiwara | G06F 3/0623 713/100 |
| 8,473,518 B1 * | 6/2013 | Yancey | G06F 21/604 707/786 |

(Continued)

OTHER PUBLICATIONS

Cloud computing—Wikipedia URL: https://en.wikipedia.org/wiki/Cloud_computing; retrieved on Sep. 17, 2018, 20 pages.

(Continued)

*Primary Examiner* — Ramon A. Mercado
(74) *Attorney, Agent, or Firm* — Butzel Long

(57) ABSTRACT

A processor can determine that a set of the memory cells is controlled by signals from a first portal. The processor can determine a function of a second portal in a relationship between the first portal and the second portal. The processor can cause, in response to a determination that the function of the second portal is a specific function, a memory control circuitry to be configured so that a subset, of the set, is controlled also by signals from the second portal. The processor can determine a function of a third portal in a relationship between the first portal and the third portal. The processor can cause, in response to a determination that the function of the third portal is the specific function, the memory control circuitry to be configured so that the subset, of the set, is controlled also by signals from the third portal.

20 Claims, 16 Drawing Sheets

(56) References Cited

U.S. PATENT DOCUMENTS

| | | | | |
|---|---|---|---|---|
| 9,361,366 B1* | 6/2016 | Yancey | ............... | G06F 16/335 |
| 2003/0159058 A1* | 8/2003 | Eguchi | ............... | G06F 3/0637 |
| | | | | 713/193 |
| 2005/0097271 A1* | 5/2005 | Davies | ............... | G06F 3/067 |
| | | | | 711/114 |
| 2007/0255865 A1* | 11/2007 | Gaither | ............... | G06F 9/5077 |
| | | | | 710/36 |
| 2011/0213789 A1* | 9/2011 | Doshi | ............... | G06F 21/6218 |
| | | | | 707/754 |
| 2011/0247051 A1* | 10/2011 | Bulumulla | ............. | G06F 21/00 |
| | | | | 726/4 |
| 2011/0314420 A1* | 12/2011 | McFarlane | ........... | G06F 3/0484 |
| | | | | 715/811 |
| 2012/0331016 A1* | 12/2012 | Janson | ............... | G06F 16/25 |
| | | | | 707/809 |
| 2014/0013051 A1* | 1/2014 | Qian | ............... | G06F 9/4411 |
| | | | | 711/115 |
| 2018/0089266 A1* | 3/2018 | Vujic | ............... | G06F 16/24537 |
| 2019/0050164 A1* | 2/2019 | Kotian | ............... | G06F 3/0665 |

OTHER PUBLICATIONS

Database—Wikipedia URL: https://en.wikipedia.org/wiki/Database#Storage; retrieved on Sep. 17, 2018, 20 pages.

Multitenancy—Wikipedia URL: https://en.wikipedia.org/wiki/Multitenancy; retrieved on Sep. 17, 2018, 4 pages.

* cited by examiner

FIG. 2

| relationship | function |
|---|---|
| Bravo Company | distributor |
| Charlie Company | distributor |

| relationship | function |
|---|---|
| Bravo Company | distributor |
| Charlie Company | other |

| relationship | function |
|---|---|
| Bravo Company | distributor |
| Charlie Company | distributor |
| Delta Company | partner |

202

| relationship | function | type of access |
|---|---|---|
| Bravo Company | distributor | read only |
| Charlie Company | distributor | read only |

| relationship | function | type of access |
|---|---|---|
| Bravo Company | distributor | read/write |
| Charlie Company | distributor | read/write |

| relationship | function | type of data | type of access |
|---|---|---|---|
| Bravo Company | distributor | contacts | read only |
| Bravo Company | distributor | sales leads | read/write |
| Charlie Company | distributor | contacts | read only |
| Charlie Company | distributor | sales leads | read/write |

FIG. 13

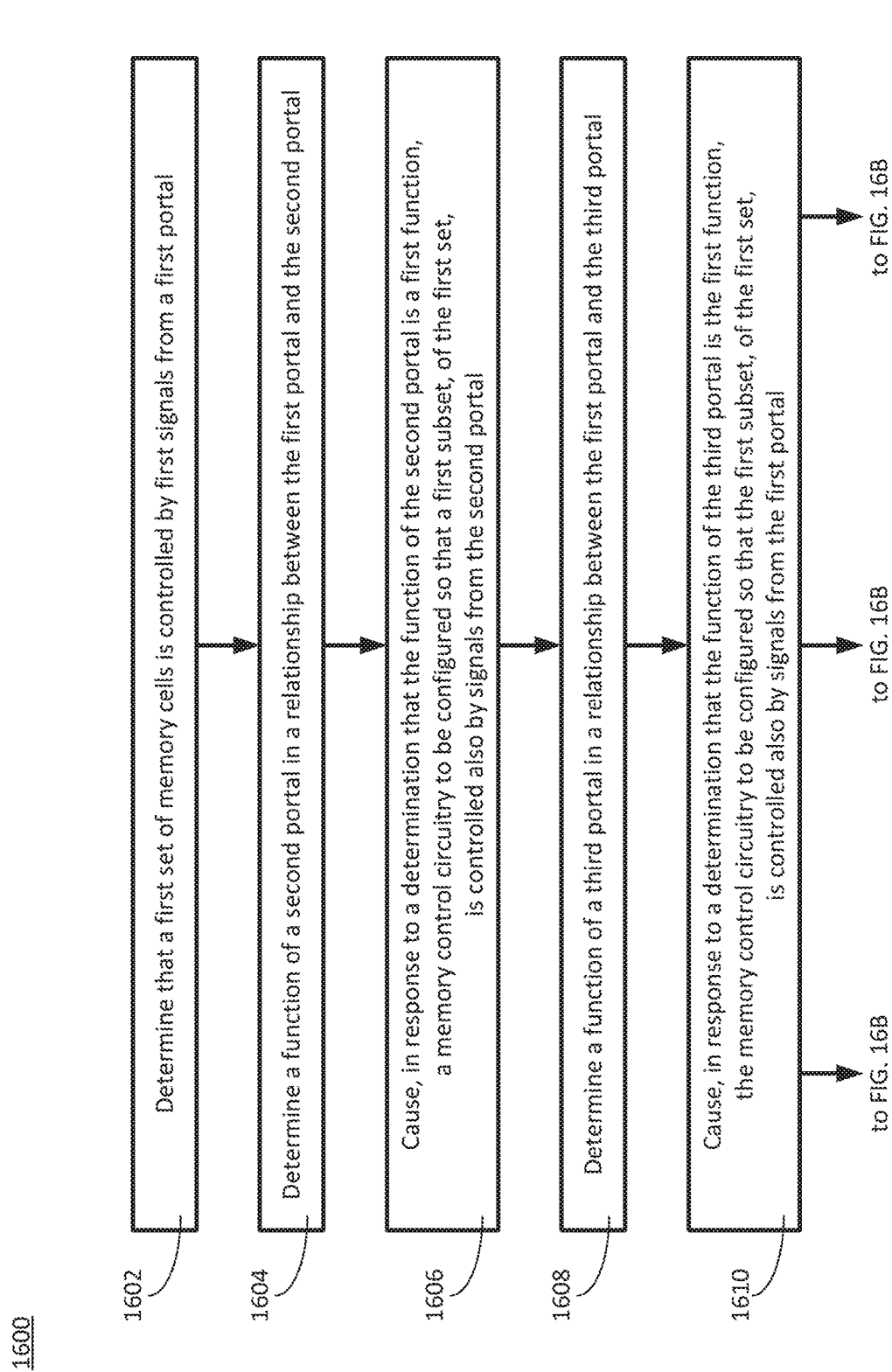

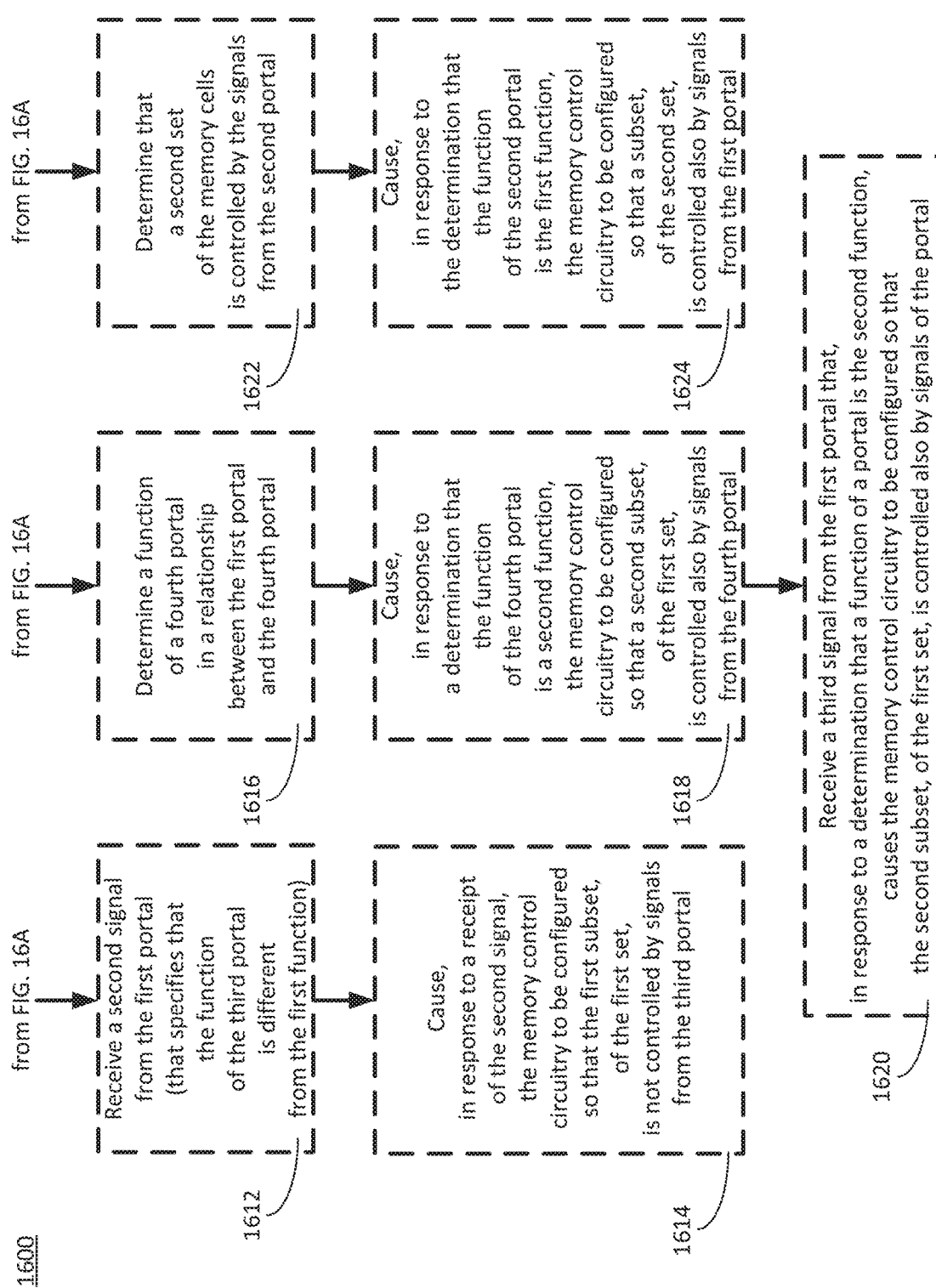

1700

1702 — Determine that a set of memory cells is controlled by signals from a first portal 1704 — Determine a function of a second portal in a relationship between the first portal and the second portal 1706 — Cause, in response to a determination that the function of the second portal is a first function, a memory control circuitry to be configured so that a first subset, of the set, is controlled also by signals from the second portal 1708 — Determine a function of a third portal in a relationship between the first portal and the third portal 1710 — Cause, in response to a determination that the function of the third portal is a second function, the memory control circuitry to be configured to that a second subset, of the set, is controlled also by signals from the third portal

1802: Determine that a first set of memory cells is controlled by signals from a first portal

1804: Determine a function of a second portal in a relationship between the first portal and the second portal

1806: Cause, in response to a determination of the function of the second portal, a memory control circuitry to be configured so that a subset, of the first set, is controlled also by signals from the second portal

1808: Determine that a second set of the memory cells is controlled by signals from the second portal

1810: Determine a function of the first portal in a relationship between the first portal and the second portal

1812: Cause, in response to a determination of the function of the first portal, the memory control circuitry to be configured so that a subset, of the second set, is controlled also by signals from the first portal

FIG. 18

CONTROLLING ACCESS TO MEMORY CELLS

BACKGROUND

A database can be an organized collection of data that can be stored in memory cells and that can be accessed through memory control circuitry controlled by a processor. A database management system can be software that can be operated by the processor so that applications and end users can interact with the memory cells of the database. The database management system can be configured so that the data stored in the memory cells can mimic, in interactions with the applications and the end users, being organized into one or more tables. A table can be a collection of data in which a set of one or more specific types of data related to one or more entities can be arranged. A specific type of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 2 is a diagram illustrating an example of a system memory that stores a table configured to record relationships between a portal and other portals, according to the disclosed technologies.

FIG. 4 is a diagram illustrating another example of the system memory that stores the table configured to record the relationships between the portal and the other portals, according to the disclosed technologies.

FIG. 6 is a diagram illustrating yet another example of the system memory that stores the table configured to record the relationships between the portal and the other portals, according to the disclosed technologies.

FIG. 10 is a diagram illustrating still another example of the system memory that stores the table configured to record the relationships between the portal and the other portals, according to the disclosed technologies.

FIG. 11 is a diagram illustrating another example of the system memory that stores the table configured to record the relationships between the portal and the other portals, according to the disclosed technologies.

FIG. 13 is a diagram illustrating yet another example of the system memory that stores the table configured to record the relationships between the portal and the other portals, according to the disclosed technologies.

FIGS. 16A and 16B are a flow diagram illustrating an example of a method for controlling access to memory cells, according to the disclosed technologies.

FIG. 17 is a flow diagram illustrating another example of a method for controlling access to the memory cells, according to the disclosed technologies.

FIG. 18 is a flow diagram illustrating yet another example of a method for controlling access to the memory cells, according to the disclosed technologies.

DETAILED DESCRIPTION

Figure 1:
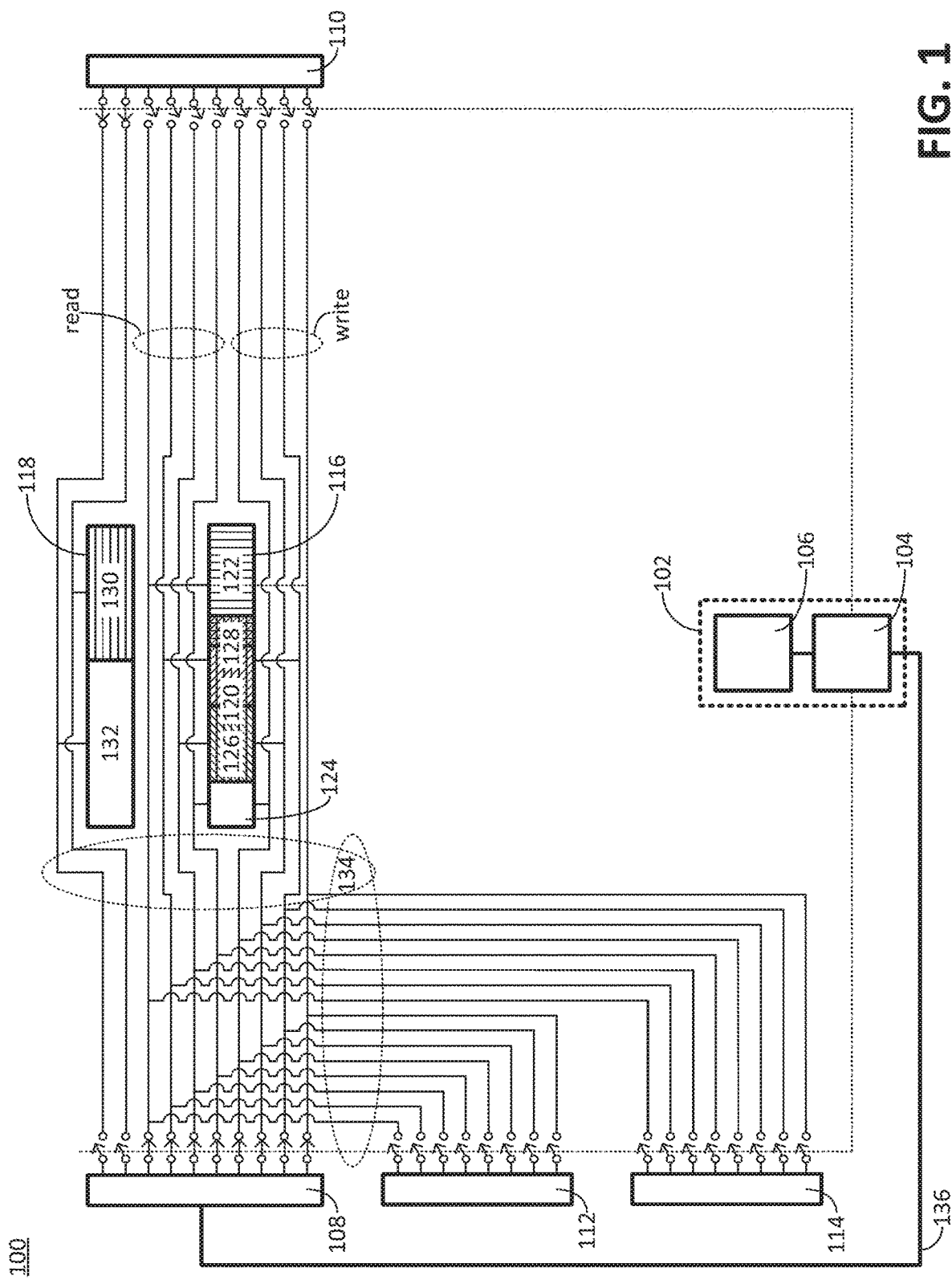
FIG. 1 is a diagram illustrating an example of an environment for a system for controlling access to memory cells, according to the disclosed technologies.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A database can be an organized collection of data that can be stored in memory cells and that can be accessed through memory control circuitry controlled by a processor. A database management system can be software that can be operated by the processor so that applications and end users can interact with the memory cells of the database. The database management system can be configured so that the data stored in the memory cells can mimic, in interactions with the applications and the end users, being organized into one or more tables. A table can be a collection of data in which a set of one or more specific items of data related to one or more entities can be arranged. A specific item of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record. A database can be used by an organization to support a variety of activities including, for example, maintaining administrative information and managing workflow.

The development of the Internet has allowed for computing resources to be distributed so that, for example, data can be sent, via the Internet, from a first location to a second location. At the second location, a computing resource can use the data to perform a function (using an application). A result of the function can be sent, via the Internet, from the second location to the first location. This, in turn, has led to the emergence of cloud computing in which an application, traditionally performed by computing resources of an organization (e.g., at the first location), can be performed by computing resources of a third party (e.g., at the second location). More recently, such third party cloud computing organizations have developed multitenancy software architecture so that a single instance of an application operating on a computing resource (e.g., a server) of a cloud computing organization can perform the function of the application for multiple client organizations (e.g., tenants). Multitenancy software architecture can be configured so that a first tenant generally does not have access to proprietary data of a second tenant, and vice versa.

However, a relationship can exist between the first tenant and the second tenant. For example, in a situation in which both the first tenant and the second tenant are tenants of a multi-tenant database, the first tenant may desire for the second tenant to have access to a subset of a set of the proprietary data of the first tenant so that the first tenant and the second tenant can collaborate. Currently, such a situation has required a human administrator of the multi-tenant database to manually perform the time-consuming operations to configure the multi-tenant database so that the second tenant can have access to the subset of the set of the proprietary data of the first tenant. Fortunately, the disclosed technologies can provide for a processor, associated with the multi-tenant database, to cause, in response to a determination of a function of the second tenant in the relationship between the first tenant and the second tenant, a memory control circuitry of the multi-tenant database to be configured so that the second tenant can have access to the subset of the set of the proprietary data of the first tenant. Data included in the subset of the set of the proprietary data of the first tenant to which the second tenant can have access can be determined based upon the function of the second tenant in the relationship between the first tenant and the second tenant.

FIG. 1 is a diagram illustrating an example of an environment 100 for a system 102 for controlling access to memory cells, according to the disclosed technologies. The environment 100 can include the system 102 and, for illustrative purposes herein, four portals and two sets of the memory cells. The system 102 can include, for example, a processor 104 and a system memory 106. The four portals can include a first portal 108, a second portal 110, a third portal 112, and a fourth portal 114. The two sets of the memory cells can include a first set 116 and a second set 118. The first set 116 can include, for illustrative purposes herein, a first subset 120 (illustrated by horizontal hatching) and a second subset 122 (illustrated by vertical hatching). The first subset 120 and the second subset 122 can intersect or can be disjoint. The first set 116 can include, for example, a portion 124 disjoint from both the first subset 120 and the second subset 122. The first subset 120 can include, for illustrative purposes herein, a first sub-subset 126 (illustrated by top right-to-bottom left diagonal hatching) and a second sub-subset 128 (illustrated by top left-to-bottom right diagonal hatching). The second set 118 can include, for illustrative purposes herein, a subset 130 (illustrated by horizontal hatching). The second set 118 can include, for example, a portion 132 disjoint from the subset 130. The environment 100 can also include a memory control circuitry 134. The memory control circuitry 134 can include, for example, a plurality of switches to control a flow of control signals through lines from the portals 108, 110, 112, and 114 to the sets of the memory cells 116 and 118. A switch, of the plurality of switches, can include, for example, a transistor, a microelectromechanical switch, or the like. Additionally or alternatively, the plurality of switches can include one or more multiplexers. The processor 104 can be configured to control a position of each of the plurality of switches. The environment 100 can also include a line 136 between the first portal 108 and the processor 104. The line 136 can be configured to convey control signals between the first portal 108 and the processor 104.

In a configuration, the memory cells can be within a multi-tenant database. For example, the multi-tenant database can include the first set 116 of the memory cells and the second set 118 of the memory cells. The first set 116 and the second set 118 can be disjoint. The first set 116 can be configured to store a first set of records. The second set 118 can be configured to store a second set of records. Fields of the first set of records can have corresponding fields of the second set of records. A field of the fields of the first set of records can be a custom field. A corresponding field of the corresponding fields of the second set of records can be a corresponding custom field. The custom field of the first set of records can be designated to store a first type of data and the corresponding custom field of the second set of records can be designated to store a second type of data.

For illustrative purposes herein: (1) the first portal 108 can be associated with Alpha Company, an organization that manufactures sprockets; (2) the second portal 110 can be associated with Bravo Company, an organization that distributes sprockets to other manufacturing organizations; (3) the third portal 112 can be associated with Charlie Company, an organization that distributes sprockets to organizations that repair items that use sprockets; and (4) the fourth portal 114 can be associated with Delta Company, an organization that manufactures roller chains (a complementary product of sprockets). For illustrative purposes herein: (1) the first set 116 of the memory cells can store proprietary data of Alpha Company (the organization associated with the first portal 108) and (2) the second set 118 of the memory cells can store proprietary data of Bravo Company (the organization associated with the second portal 110). (This is illustrated in FIG. 1 in which: (1) the switches in the lines between the first portal 108 and the first set 116 of the memory cells are closed, (2) the switches in the lines between the second portal 110 and the second set 118 of the memory cells are closed, and (3) all other switches are open.) The first subset 120 can store proprietary data for contacts and sales leads for Alpha Company (the organization associated with the first portal 108). The first sub-subset 126 can store the contacts and the second sub-subset 128 can store the sales leads. The second subset 122 can store proprietary data for some of the sales leads and product specifications for the sprockets manufactured by Alpha Company (the organization associated with the first portal 108). The subset 130 can store proprietary data for contacts and sales leads for Bravo Company (the organization associated with the second portal 110).

The processor 104 can be configured to determine that the first set 116 of the memory cells is controlled by first signals from the first portal 108. (This is illustrated in FIG. 1 in which the switches in the lines between the first portal 108 and the first set 116 of the memory cells are closed.)

The processor 104 can be configured to determine a function of the second portal 110 in a relationship between the first portal 108 and the second portal 110. For example, the processor 104 can determine the function of the second portal 110 by retrieving the function of the second portal 110 from a table. The table can be stored, for example, in the system memory 106. The table can be configured to record: (1) relationships between the first portal 108 and other portals and (2) functions of the other portals in the relationship. FIG. 2 is a diagram illustrating an example of the system memory 106 that stores a table 202 configured to record relationships between the first portal 108 and other portals, according to the disclosed technologies. For example, the table 202: (1) can be for Alpha Company (the organization associated with the first portal 108), (2) can illustrate an existence of a relationship with Bravo Company (the organization associated with the second portal 110), and (3) can illustrate that the function of Bravo Company, in the relationship, is to serve as a distributor of the sprockets manufactured by Alpha Company. With reference to FIGS. 1 and 2, additionally or alternatively, for example, the processor 104 can determine the function of the second portal 110 by receiving a second signal from the first portal 108. For example, the second signal can be conveyed by the line 136. The second signal can include an information that: (1) specifies the relationship between the first portal 108 and the second portal 110 and (2) the function of the second portal 110. Optionally, this information can be stored in the table 202.

Figure 3:
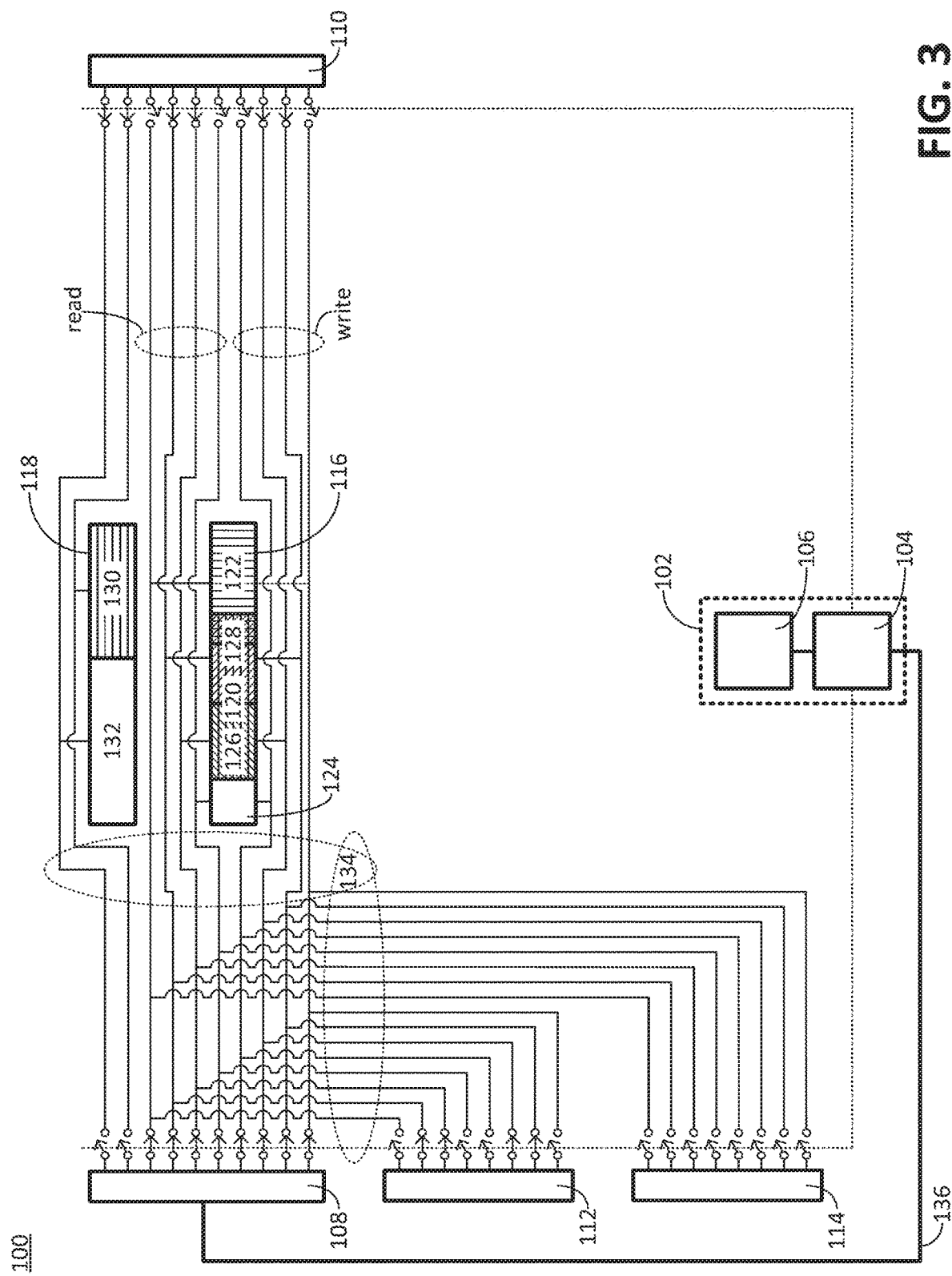
FIG. 3 is a diagram illustrating another example of the environment for the system for controlling access to the memory cells, according to the disclosed technologies.

The processor 104 can be configured to cause, in response to a determination that the function of the second portal 110 is a first function (e.g., a distributor), the memory control circuitry 134 to be configured so that the first subset 120, of the first set 116 of the memory cells, is controlled also by signals from the second portal 110. (This is illustrated in FIG. 3 in which the switches in the lines between the second portal 110 and the first subset 120, of the first set 116 of the memory cells, are closed.) In this manner, Bravo Company can have access to the proprietary data for the contacts and the sales leads for Alpha Company.

The processor 104 can be configured to determine a function of the third portal 112 in a relationship between the first portal 108 and the third portal 112. For example, the processor 104 can determine the function of the third portal 112 by retrieving the function of the third portal 112 from the table 202. For example, the table 202: (1) can illustrate an existence of a relationship with Charlie Company (the organization associated with the third portal 112) and (2) can illustrate that the function of Charlie Company, in the relationship, is to serve as a distributor of the sprockets manufactured by Alpha Company. With reference to FIGS. 1 and 2, additionally or alternatively, for example, the processor 104 can determine the function of the third portal 110 by receiving a third signal from the first portal 108. For example, the third signal can be conveyed by the line 136. The third signal can include an information that: (1) specifies the relationship between the first portal 108 and the third portal 112 and (2) the function of the third portal 112. Optionally, this information can be stored in the table 202.

The processor 104 can be configured to cause, in response to a determination that the function of the third portal 112 is the first function (e.g., a distributor) (i.e., the same function as the function of the second portal 110), the memory control circuitry 134 to be configured so that the first subset 120, of the first set 116 of the memory cells, is controlled also by signals from the third portal 112. (This is illustrated in FIG. 3 in which the switches in the lines between the third portal 112 and the first subset 120, of the first set 116 of the memory cells, are closed.) In this manner, Charlie Company can have access to the proprietary data for the contacts and the sales leads for Alpha Company.

Optionally, the processor 104 can be configured to receive, after the memory control circuitry 134 has been configured so that the first subset 120, of the first set 116 of the memory cells, is controlled also by signals from the third portal 112, a fourth signal from the first portal 108. The fourth signal can include an information that specifies that the function of the third portal 112 is different from the first function (e.g., a distributor). For example, Charlie Company may no longer serve as a distributor of the sprockets manufactured by Alpha Company. Optionally, this information can be stored in the table 202. (This is illustrated in FIG. 4 in which the table 202 can illustrate that the function of Charlie Company, in the relationship, is other than to serve as a distributor of the sprockets manufactured by Alpha Company.)

Figure 5:
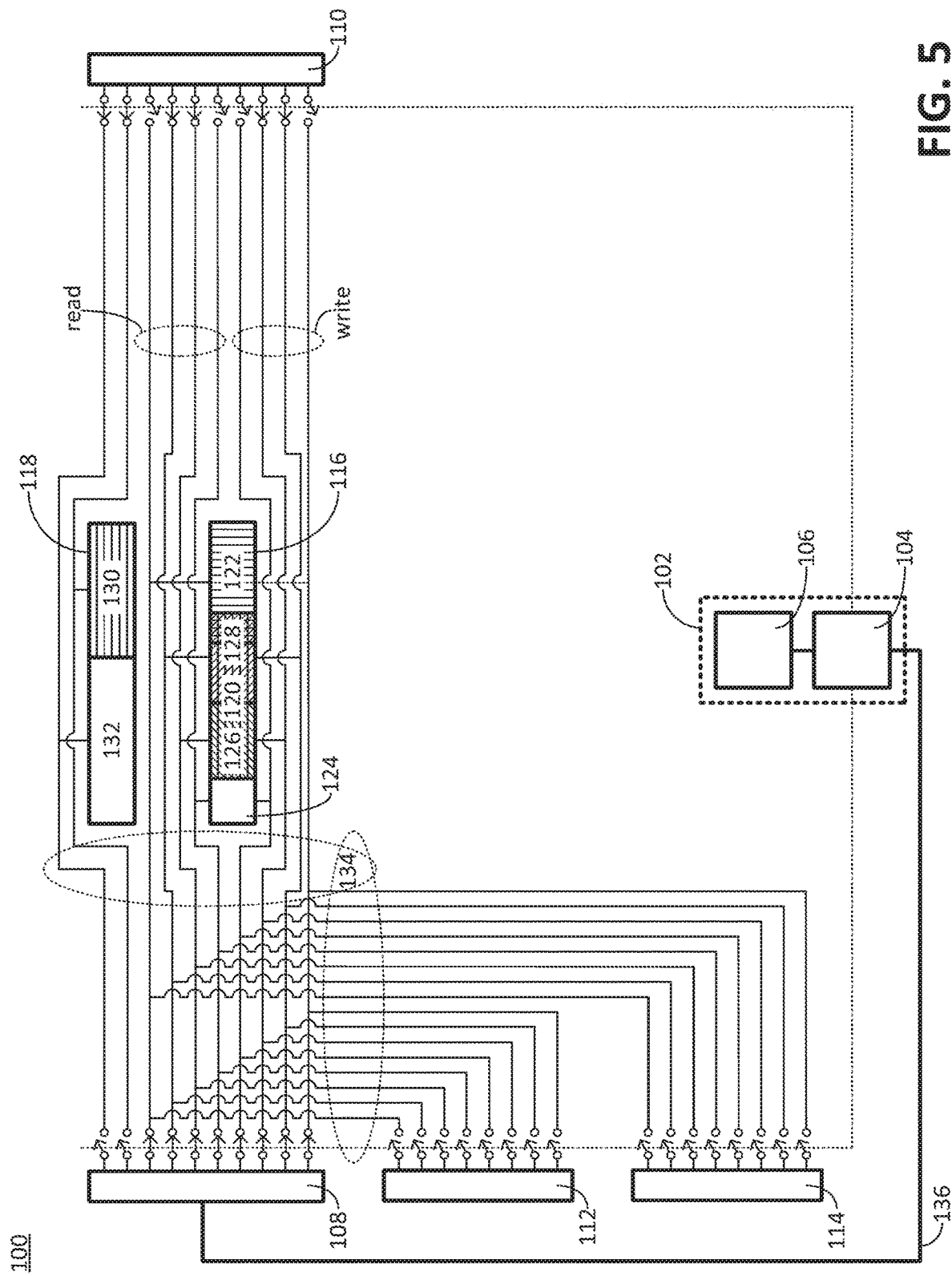
FIG. 5 is a diagram illustrating yet another example of the environment for the system for controlling access to the memory cells, according to the disclosed technologies.

Optionally, the processor 104 can be configured to cause, in response to a receipt of the fourth signal, the memory control circuitry 134 to be configured so that the first subset 120, of the first set 116 of the memory cells, is not controlled by the signals from the third portal 112. (This is illustrated in FIG. 5 in which: (1) the switches in the lines between the second portal 110 and the first subset 120, of the first set 116 of the memory cells, are closed, but (2) the switches in the lines between the third portal 112 and the first subset 120, of the first set 116 of the memory cells, are open.)

Optionally, the processor 104 can be configured to determine a function of the fourth portal 114 in a relationship between the first portal 108 and the fourth portal 114. For example, the processor 104 can determine the function of the fourth portal 114 by retrieving the function of the fourth portal 114 from the table 202. For example, the table 202: (1) can illustrate an existence of a relationship with Delta Company (the organization associated with the fourth portal 114) and (2) can illustrate that the function of Delta Company, in the relationship, is to serve as partner with Alpha Company (e.g., because Delta Company is an organization that manufactures roller chains (a complementary product of sprockets)). Optionally, this information can be stored in the table 202. (This is illustrated in FIG. 6 in which the table 202 can illustrate that the function of Delta Company, in the relationship, is to serve as a partner with Alpha Company.)

Figure 7:
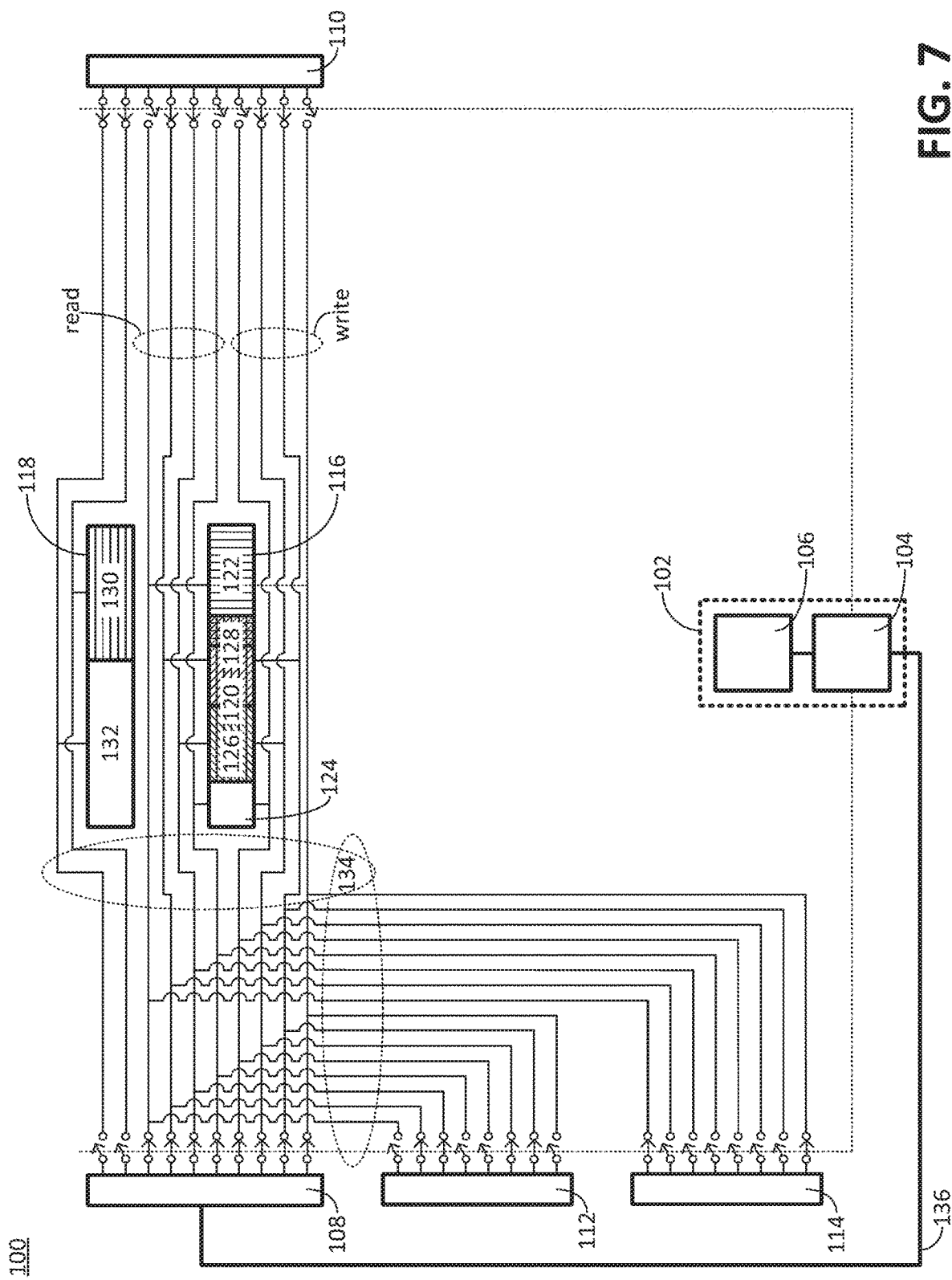
FIG. 7 is a diagram illustrating still another example of the environment for the system for controlling access to the memory cells, according to the disclosed technologies.

Optionally, the processor 104 can be configured to cause, in response to a determination that the function of the fourth portal 114 is a second function (e.g., a partner) (i.e., a different function from the function of the second portal 110 and the third portal 112), the memory control circuitry 134 to be configured so that the second subset 122, of the first set 116 of the memory cells, is controlled also by signals from the fourth portal 114. (This is illustrated in FIG. 7 in which the switches in the lines between the fourth portal 112 and the second subset 122, of the first set 116 of the memory cells, are closed.) In this manner, Delta Company can have access to the proprietary data for some of the sales leads and the product specifications for the sprockets manufactured by Alpha Company.

Optionally, in general, the processor 104 can be configured to receive, a fifth signal from the first portal 108. The fifth signal can include an information that, in response to a determination that a function of a portal is the second function (e.g., a partner), causes the memory control circuitry 134 to be configured so that the second subset 122, of the first set 116 of the memory cells, is controlled also by signals of the portal. For example, Alpha Company (the organization associated with the first portal 108) may determine an existence of a relationship between an organization associated with the portal and cause the fifth signal to be conveyed from the first portal 108 to the processor 104.

Optionally, the processor 104 can be configured to determine that the second set 118 of the memory cells is controlled by signals from the second portal 110. (This is illustrated in FIG. 1 in which the switches in the lines between the second portal 110 and the second set 118 of the memory cells are closed.)

Figure 8:
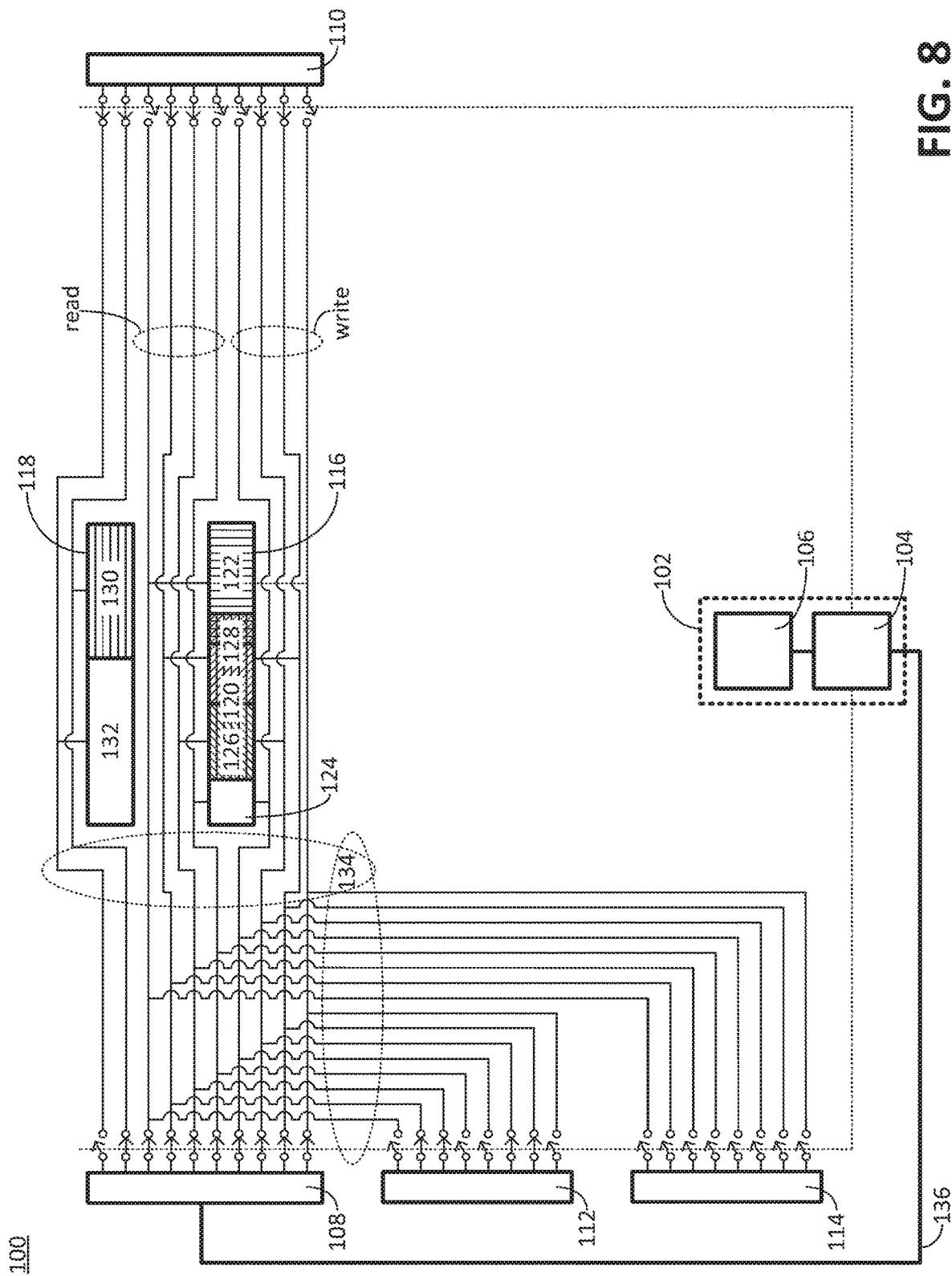
FIG. 8 is a diagram illustrating another example of the environment for the system for controlling access to the memory cells, according to the disclosed technologies.

Optionally, the processor 104 can be configured to cause, in response to the determination that the function of the second portal 110 is the first function (e.g., a distributor), the memory control circuitry 134 to be configured so that the subset 130, of the second set 118 of the memory cells, is controlled also by the signals from the first portal 108. (This is illustrated in FIG. 8 in which the switch in the line between the second portal 110 and the subset 130, of the second set 118 of the memory cells, is closed.) In this manner, Alpha Company can have access to the proprietary data for the contacts and the sales leads for Bravo Company.

Figure 9:
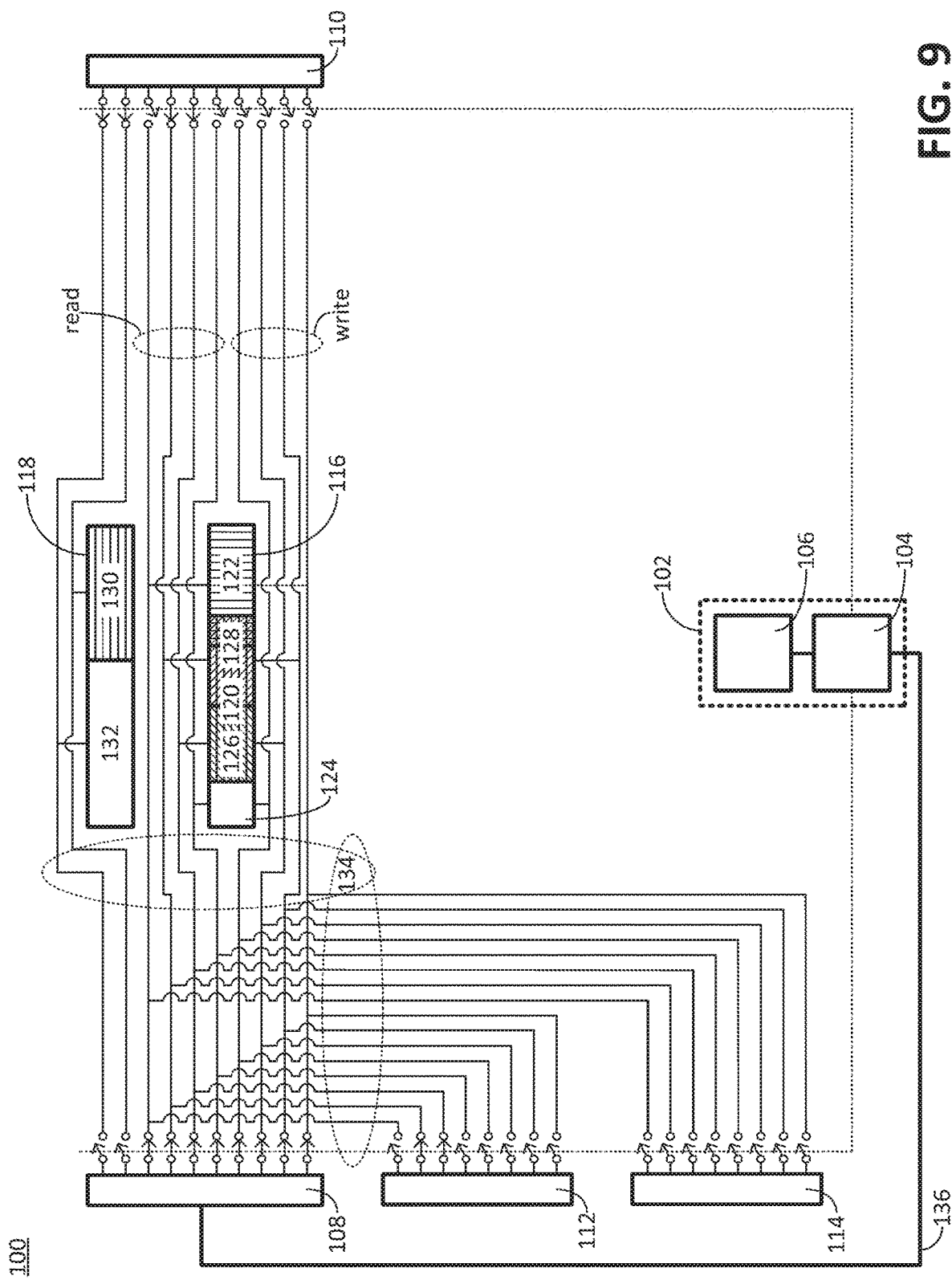
FIG. 9 is a diagram illustrating yet another example of the environment for the system for controlling access to the memory cells, according to the disclosed technologies.

Optionally: (1) the signals from the second portal 110 can include signals to cause a device coupled to the second portal 110 (not illustrated) only to read data from the first subset 120, of the first set 116 of the memory cells; and (2) the signals from the third portal 112 can include signals to cause a device coupled to the third portal 112 (not illustrated) only to read the data from the first subset 120 of the first set 116 of the memory cells. (This is illustrated in FIG. 9 in which: (1) the switches in the read lines between the second portal 110 and the first subset 120, of the first set 116 of the memory cells, are closed, but (2) the switches in the write lines between the second portal 110 and the first subset 120, of the first set 116 of the memory cells, are open; and (3) the switches in the read lines between the third portal 112 and the first subset 120, of the first set 116 of the memory cells, are closed, but (4) the switches in the write lines between the third portal 112 and the first subset 120, of the first set 116 of the memory cells, are open.) In this manner, Bravo Company and Charlie Company can have read only access to the proprietary data for the contacts and the sales leads for Alpha Company.

FIG. 10 is a diagram illustrating an example of the system memory 106 that stores a table 1002 configured to record relationships between the first portal 108 and other portals, according to the disclosed technologies. For example, the table 1002: (1) can be for Alpha Company (the organization associated with the first portal 108); (2) can illustrate an existence of a relationship with Bravo Company (the organization associated with the second portal 110); (3) can illustrate that the function of Bravo Company, in the relationship, is to serve as a distributor of the sprockets manufactured by Alpha Company; (4) can illustrate that the type of access, for Bravo Company, to the proprietary data for Alpha Company is read only access; (5) can illustrate an existence of a relationship with Charlie Company (the organization associated with the third portal 112); (6) can illustrate that the function of Charlie Company, in the relationship, is to serve as a distributor of the sprockets manufactured by Alpha Company; and (7) can illustrate that the type of access, for Charlie Company, to the proprietary data for Alpha Company is read only access.

Optionally: (1) the signals from the second portal 110 can include signals to cause a device coupled to the second portal 110 (not illustrated) (a) to read first data from the first subset 120, of the first set 116 of the memory cells, and (b) to write second data to the first subset 120; and (2) the signals from the third portal 112 can include signals to cause a device coupled to the third portal 112 (not illustrated) (a) to read the first data from the first subset 120 of the first set 116 of the memory cells, and (b) to write third data to the first subset 120. (This is illustrated in FIG. 3 in which: (1) the switches in both the read lines and the write lines between the second portal 110 and the first subset 120, of the first set 116 of the memory cells, are closed; and (2) the switches in both the read lines and the write lines between the third portal 112 and the first subset 120, of the first set 116 of the memory cells, are closed.) In this manner, Bravo Company and Charlie Company can have both read and write access to the proprietary data for the contacts and the sales leads for Alpha Company.

FIG. 11 is a diagram illustrating an example of the system memory 106 that stores the table 1002 configured to record relationships between the first portal 108 and the other portals, according to the disclosed technologies. For example, the table 1002: (1) can be for Alpha Company (the organization associated with the first portal 108); (2) can illustrate the existence of the relationship with Bravo Company (the organization associated with the second portal 110); (3) can illustrate that the function of Bravo Company, in the relationship, is to serve as a distributor of the sprockets manufactured by Alpha Company; (4) can illustrate that the type of access, for Bravo Company, to the proprietary data for Alpha Company is both read and write access; (5) can illustrate the existence of the relationship with Charlie Company (the organization associated with the third portal 112); (6) can illustrate that the function of Charlie Company, in the relationship, is to serve as a distributor of the sprockets manufactured by Alpha Company; and (7) can illustrate that the type of access, for Charlie Company, to the proprietary data for Alpha Company is both read and write access.

Figure 12:
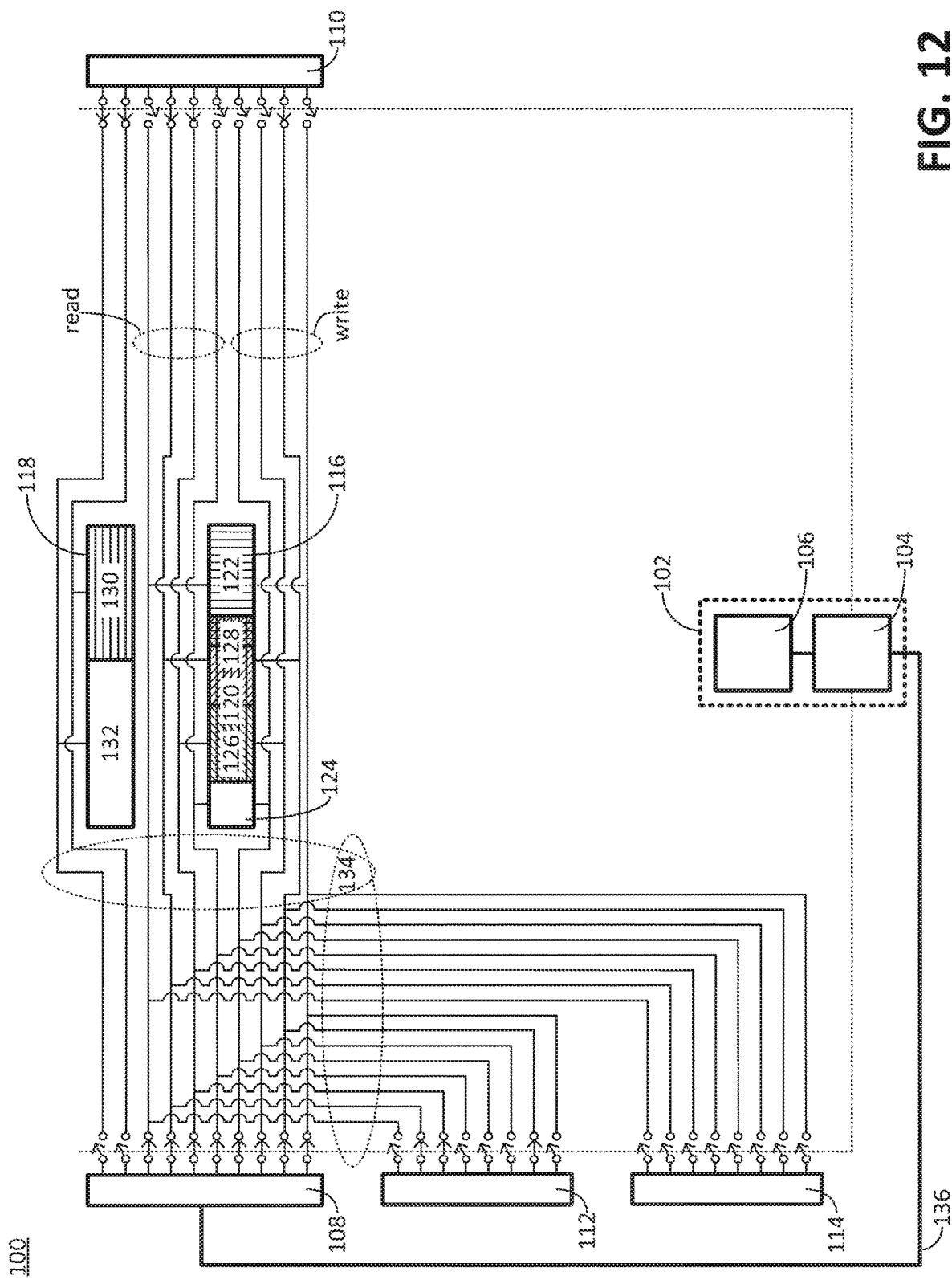
FIG. 12 is a diagram illustrating still another example of the environment for the system for controlling access to the memory cells, according to the disclosed technologies.

Optionally: (1) the signals from the second portal 110 can include signals to cause a device coupled to the second portal 110 (not illustrated) (a) only to read first data from the first sub-subset 126 of the first subset 120, and (b) both (i) to read second data from the second sub-subset 128 of the first subset 120 and (ii) to write third data to the second sub-subset 128; and (2) the signals from the third portal 112 can include signals to cause a device coupled to the third portal 112 (not illustrated) (a) only to read the first data from the first sub-subset 126 of the first subset 120, and (b) both (i) to read the second data from the second sub-subset 128 of the first subset 120 and (ii) to write fourth data to the second sub-subset 128. (This is illustrated in FIG. 12 in which: (1) the switch in the read line between the second portal 110 and the first sub-subset 126 of the first subset 120 is closed, but (2) the switch in the write line between the second portal 110 and the first sub-subset 126 of the first subset 120 is open, and (3) the switches in both the read line and the write line between the second portal 110 and the second sub-subset 128 of the first subset 120 are closed; and (4) the switch in the read line between the third portal 112 and the first sub-subset 126 of the first subset 120 is closed, but (5) the switch in the write line between the third portal 112 and the first sub-subset 126 of the first subset 120 is open, and (6) the switches in both the read line and the write line between the third portal 112 and the second sub-subset 128 of the first subset 120 are closed.) In this manner, Bravo Company and Charlie Company: (1) can have read only access to the proprietary data for the contacts for Alpha Company, and (2) can have both read and write access to the proprietary data for the sales leads for Alpha Company.

FIG. 13 is a diagram illustrating an example of the system memory 106 that stores a table 1302 configured to record relationships between the first portal 108 and other portals, according to the disclosed technologies. For example, the table 1302: (1) can be for Alpha Company (the organization associated with the first portal 108); (2) can illustrate an existence of a relationship with Bravo Company (the organization associated with the second portal 110); (3) can illustrate that the function of Bravo Company, in the relationship, is to serve as a distributor of the sprockets manufactured by Alpha Company; (4) can illustrate that, for the proprietary data for the contacts for Alpha Company, the type of access, for Bravo Company, is read only access; (5) can illustrate that, for the proprietary data for the sales leads for Alpha Company, the type of access, for Bravo Company, is both read and write access; (6) can illustrate an existence of a relationship with Charlie Company (the organization associated with the third portal 112); (7) can illustrate that the function of Charlie Company, in the relationship, is to serve as a distributor of the sprockets manufactured by Alpha Company; (8) can illustrate that, for the proprietary data for the contacts for Alpha Company, the type of access, for Charlie Company, is read only access; and (9) can illustrate that, for the proprietary data for the sales leads for Alpha Company, the type of access, for Charlie Company, is both read and write access.

Figure 14:
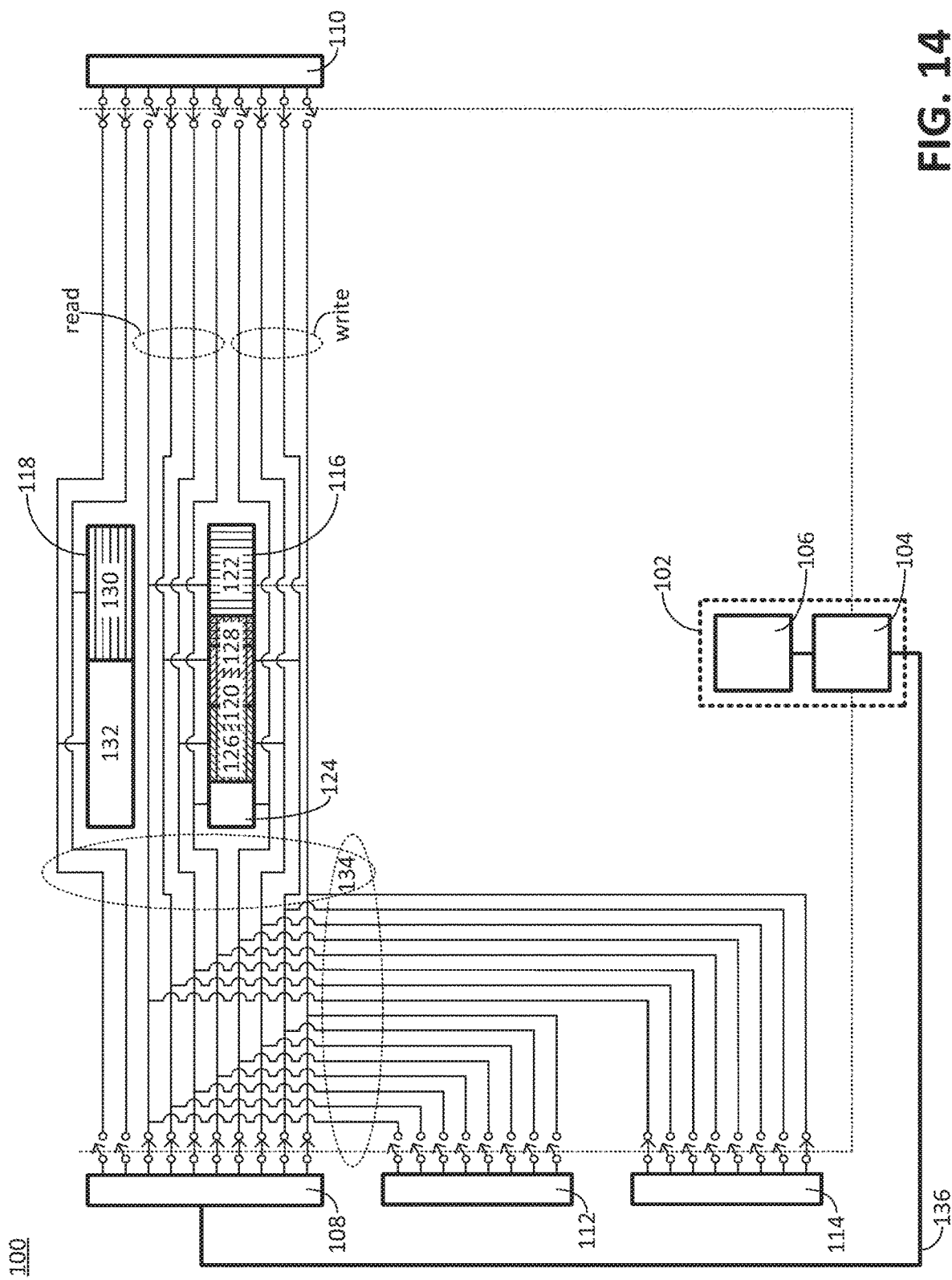
FIG. 14 is a diagram illustrating another example of the environment for the system for controlling access to the memory cells, according to the disclosed technologies.

Alternatively, the processor 104 can be configured to determine that the first set 116 of the memory cells is controlled by signals from the first portal 108. The processor 104 can be configured to determine a function of the second portal 110 in a relationship between the first portal 108 and the second portal 110. The processor 104 can be configured to cause, in response to a determination that the function of the second portal 110 is a first function (e.g., a distributor), the memory control circuitry 134 to be configured so that the first subset 120, of the first set 116 of the memory cells, is controlled also by signals from the second portal 110. (This is illustrated in FIG. 14 in which the switches in the lines between the second portal 110 and the first subset 120, of the first set 116 of the memory cells, are closed.) In this manner, Bravo Company can have access to the proprietary data for the contacts and the sales leads for Alpha Company.

The processor 104 can be configured to determine a function of the fourth portal 114 in a relationship between the first portal 108 and the fourth portal 114. The processor 104 can be configured to cause, in response to a determination that the function of the fourth portal 114 is a second function (e.g., a partner) (i.e., a different function from the function of the second portal 110), the memory control circuitry 134 to be configured so that the second subset 122, of the first set 116 of the memory cells, is controlled also by signals from the fourth portal 114. (This is illustrated in FIG. 14 in which the switches in the lines between the first portal 108 and the first set 116, of the memory cells, are closed and the switches in the lines between the fourth portal 114 and the second subset 122, of the first set 116 of the memory cells, are closed.) In this manner, Delta Company can have access to the proprietary data for some of the sales leads and the product specifications for the sprockets manufactured by Alpha Company.

Figure 15:
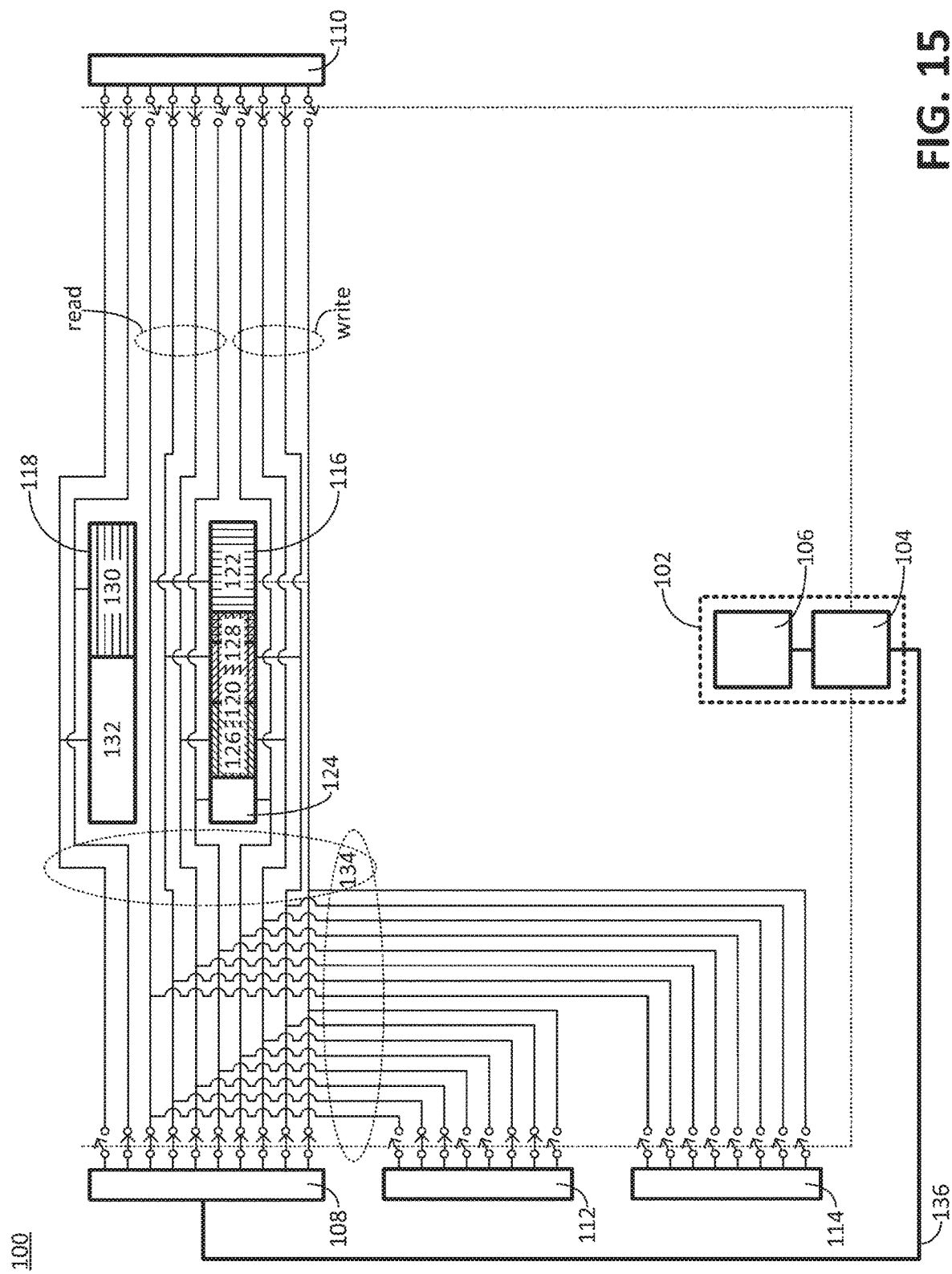
FIG. 15 is a diagram illustrating yet another example of the environment for the system for controlling access to the memory cells, according to the disclosed technologies.

Alternatively, the processor 104 can be configured to determine that the first set 116 of the memory cells is controlled by signals from the first portal 108. The processor 104 can be configured to determine a function of the second portal 110 in a relationship between the first portal 108 and the second portal 110. The processor 104 can be configured to cause, in response to a determination of the function of the second portal 110, the memory control circuitry 134 to be configured so that the first subset 120, of the first set 116 of the memory cells, is controlled also by signals from the second portal 110. (This is illustrated in FIG. 15 in which the switches in the lines between the second portal 110 and the first subset 120, of the first set 116 of the memory cells, are closed.) In this manner, Bravo Company can have access to the proprietary data for the contacts and the sales leads for Alpha Company.

The processor 104 can be configured to determine that the second set 118 of the memory cells is controlled by signals from the second portal 110. The processor 104 can be configured to determine a function of the first portal 108 in the relationship between the first portal 108 and the second portal 110. The processor 104 can be configured to cause, in response to a determination of the function of the first portal 110, the memory control circuitry 134 to be configured so that the subset 130, of the second set 118 of the memory cells, is controlled also by signals from the first portal 108. (This is illustrated in FIG. 15 in which the switch in the line between the second portal 110 and the subset 130, of the second set 118 of the memory cells, are closed.) In this manner, Alpha Company can have access to the proprietary data for the contacts and the sales leads for Bravo Company.

FIGS. 16A and 16B are a flow diagram illustrating an example of a method 1600 for controlling access to memory cells, according to the disclosed technologies. In FIG. 16A, in the method 1600, at an operation 1602, a processor can determine that a first set of the memory cells is controlled by first signals from a first portal.

At an operation 1604, the processor can determine a function of a second portal in a relationship between the first portal and the second portal. For example, the function of the second portal can be determined by retrieving the function of the second portal from a table. The table can be configured to record relationships between the first portal and other portals and functions of the other portals in the relationships. Additionally or alternatively, the function of the second portal can be determined by receiving a second signal from the first portal. The second signal can include an information that specifies the relationship between the first portal and the second portal and the function of the second portal.

At an operation 1606, the processor can cause, in response to a determination that the function of the second portal is a first function, a memory control circuitry to be configured so that a first subset, of the first set, is controlled also by signals from the second portal. Optionally, the signals from the second portal can include signals to cause a device coupled to the second portal only to read first data from the first subset. Optionally, the signals from the second portal can include signals to cause the device coupled to the second portal both (1) to read the first data from the first subset and (2) to write second data to the first subset. Optionally, the first subset can include a first sub-subset and a second sub-subset. The signals from the second portal can include, for example, signals to cause the device coupled to the second portal (1) only to read third data from the first sub-subset and (2) both to read fourth data from the second sub-subset and to write fifth data to the second sub-subset.

At an operation 1608, the processor can determine a function of a third portal in a relationship between the first portal and the third portal. For example, the function of the third portal can be determined by retrieving the function of the third portal from the table. Additionally or alternatively, the function of the third portal can be determined by receiving a third signal from the first portal. The third signal can include an information that specifies the relationship between the first portal and the third portal and the function of the third portal.

At an operation 1610, the processor can cause, in response to a determination that the function of the third portal is the first function, the memory control circuitry to be configured so that the first subset, of the first set, is controlled also by signals from the third portal. Optionally, the signals from the third portal can include signals to cause a device coupled to the third portal only to read the first data from the first subset. Optionally, the signals from the third portal can include signals to cause the device coupled to the third portal both (1) to read the first data from the first subset and (2) to write sixth data to the first subset. Optionally, the first subset can include the first sub-subset and the second sub-subset. The signals from the third portal can include, for example, signals to cause the device coupled to the third portal (1) only to read the third data from the first sub-subset and (2) both to read the fourth data from the second sub-subset and to write sixth data to the second sub-subset.

In FIG. 16B, at an optional operation 1612, the processor can receive, after the memory control circuitry has been configured so that the first subset, of the first set, is controlled also by signals from the third portal, a fourth signal from the first portal. The fourth signal can include an information that specifies that the function of the third portal is different from the first function. At an optional operation 1614, the processor can cause, in response to a receipt of the fourth signal, the memory control circuitry to be configured so that the first subset, of the first set, is not controlled by the signals from the third portal.

At an optional operation 1616, the processor can determine a function of a fourth portal in a relationship between the first portal and the fourth portal. At an optional operation 1618, the processor can causes, in response to a determination that the function of the fourth portal is a second function, the memory control circuitry to be configured so that a second subset, of the first set, is controlled also by signals from the fourth portal. At an optional operation 1620, the processor can receive a fifth signal from the first portal. The fifth signal can include an information that, in response to a determination that a function of a portal is the second function, causes the memory control circuitry to be configured so that the second subset, of the first set, is controlled also by signals of the portal.

At an optional operation 1622, the processor can determine that a second set of the memory cells is controlled by the signals from the second portal. At an optional operation 1624, the processor can cause, in response to the determination that the function of the second portal is the first function, the memory control circuitry to be configured so that a subset, of the second set, is controlled also by the signals from the first portal.

FIG. 17 is a flow diagram illustrating an example of a method 1700 for controlling access to the memory cells, according to the disclosed technologies. In the method 1700, at an operation 1702, a processor can determine that a set of the memory cells is controlled by signals from a first portal. At an operation 1704, the processor can determine a function of a second portal in a relationship between the first portal and the second portal. At an operation 1706, the processor can cause, in response to a determination that the function of the second portal is a first function, a memory control circuitry to be configured so that a first subset, of the set, is controlled also by signals from the second portal. At an operation 1708, the processor can determine a function of a third portal in a relationship between the first portal and the third portal. At an operation 1710, the processor can cause, in response to a determination that the function of the third portal is a second function, the memory control circuitry to be configured so that a second subset, of the set, is controlled also by signals from the third portal.

FIG. 18 is a flow diagram illustrating an example of a method 1800 for controlling access to the memory cells, according to the disclosed technologies. In the method 1800, at an operation 1802, a processor can determine that a first set of the memory cells is set controlled by signals from a first portal. At an operation 1804, the processor can determine a function of a second portal in a relationship between the first portal and the second portal. At an operation 1806, the processor can cause, in response to a determination of the function of the second portal, a memory control circuitry to be configured so that a subset, of the first set, is controlled also by signals from the second portal. At an operation 1808, the processor can determine that a second set of the memory cells is controlled by the signals from the second portal. At an operation 1810, the processor can determine a function of the first portal in the relationship between the first portal and the second portal. At an operation 1812, the processor can cause, in response to a determination of the function of the first portal, the memory control circuitry to be configured so that a subset, of the second set, is controlled also by the signals from the first portal.

Various implementations for controlling access to memory cells can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for controlling access to memory cells.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for controlling access to memory cells. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for controlling access to memory cells.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for controlling access to memory cells, the method comprising:
controlling, by a processor, a first set of the memory cells to be accessed by a first tenant through a memory control circuitry by first signals from a first tenant portal, the first set of memory cells further comprises at least one first subset of memory cells;
determining, by the processor, a relationship between the first tenant and a second tenant;
causing, by the processor in response to a determination that the relationship between the first tenant and the second tenant is a first relationship, the memory control circuitry to be configured so that the first subset, of the first set of the memory cells, is to be also accessed by a second tenant through the memory control circuitry by second signals from a second tenant portal;
determining, by the processor, a relationship between the first tenant and a third tenant; and
causing, by the processor in response to a determination that the relationship between the first tenant and the third tenant is the first relationship, the memory control circuitry to be configured so that the first subset, of the first set of the memory cells, is to be also accessed by a third tenant through the memory control circuitry by third signals from a third tenant portal.

2. The method of claim 1, wherein the determining the relationship of the second tenant comprises retrieving the relationship of the second tenant from a table, the table configured to record relationships between the first tenant and other tenants and relationships of the other tenants in relationships, and
the determining the relationship of the third tenant comprises retrieving the relationship of the third tenant from the table.

3. The method of claim 1, wherein the determining the relationship of the second tenant comprises receiving a second signal from the first tenant portal, the second signal including an information that specifies the relationship between the first tenant and the second tenant, and
the determining the relationship of the third tenant comprises receiving a third signal from the first tenant portal, the third signal including an information that specifies the relationship between the first tenant and the third tenant.

4. The method of claim 1, further comprising:
receiving, by the processor after the memory control circuitry has been configured so that the first subset, of the first set, is to be also accessed by the third tenant through the memory control circuitry by signals from the third tenant portal, a second signal from the first tenant portal, the second signal including an information that specifies that the relationship between the first tenant and the third tenant is different from the first relationship; and
causing, by the processor in response to a receipt of the second signal, the memory control circuitry to be configured so that the first subset, of the first set, is prevented from being accessed by the third tenant through the memory control circuitry by the signals from the third tenant portal.

5. The method of claim 1, further comprising:
determining, by the processor, a relationship between the first tenant and the fourth tenant; and
causing, by the processor in response to a determination that the relationship between the first tenant and the fourth tenant portal is a second relationship, the memory control circuitry to be configured so that a second subset, of the first set of the memory cells, is to be also accessed by the fourth tenant through the memory control circuitry by signals from a fourth tenant portal.

6. The method of claim 5, further comprising:
receiving, by the processor, a second signal from the first tenant portal, the second signal including an information that, in response to a determination that a relationship between the first tenant and a tenant is the second relationship, causes the memory control circuitry to be configured so that the second subset, of the first set of the memory cells, is to be also accessed by the tenant through the memory control circuitry by signals of the tenant portal.

7. The method of claim 1, further comprising:
determining, by the processor, that a second set of the memory cells is to be accessed through the memory control circuitry by the signals from the second tenant portal;
causing, by the processor in response to the determination that the relationship between the first tenant and the second tenant is the first relationship, the memory control circuitry to be configured so that a subset, of the second set of the memory cells, is to be also accessed by the first tenant through the memory control circuitry by the signals from the first tenant portal.

8. The method of claim 1, wherein the signals from the second tenant portal comprise signals to cause a device coupled to the second tenant portal only to read data from the first subset, and
the signals from the third portal comprise signals to cause a device coupled to the third tenant portal only to read the data from the first subset.

9. The method of claim 1, wherein the signals from the second tenant portal comprise signals to cause a device coupled to the second tenant portal both to read first data from the first subset and to write second data to the first subset, and
the signals from the third tenant portal comprise signals to cause a device coupled to the third tenant portal both to read the first data from the first subset and to write third data to the first subset.

10. The method of claim 1, wherein the first subset comprises a first sub-subset and a second sub-subset,
the signals from the second tenant portal comprise signals to cause a device coupled to the second tenant portal only to read first data from the first sub-subset,
the signals from the third tenant portal comprise signals to cause a device coupled to the third tenant portal only to read the first data from the first sub-subset,
the signals from the second tenant portal comprise signals to cause the device coupled to the second tenant portal both to read second data from the second sub-subset and to write third data to the second sub-subset, and
the signals from the third tenant portal comprise signals to cause the device coupled to the third tenant portal both to read the second data from the second sub-subset and to write fourth data to the second sub-subset.

11. A non-transitory computer-readable medium storing computer code for controlling access to memory cells, the computer code including instructions to cause the processor to:
  determine that a set of the memory cells is to be accessed through a memory control circuitry by signals from a first tenant portal, the set of memory cells further comprises at least one subset of memory cells;
  determine a function of a second portal in a relationship between the first tenant and the second tenant;
  cause, in response to a determination that the relationship between the first tenant and the second tenant is a specific relationship, the memory control circuitry to be configured so that the subset, of the set of the memory cells, is to be also accessed by the second tenant through the memory control circuitry by signals from the second tenant portal;
  determine a relationship between the first tenant and the third tenant; and
  cause, in response to a determination that the relationship between the first tenant and the third tenant is the specific relationship, the memory control circuitry to be configured so that the subset, of the set of the memory cells, is to be also accessed by the third tenant through the memory control circuitry by signals from the third tenant portal.

12. A system for controlling access to memory cells, the system comprising:
  a system memory; and
  a processor coupled to the system memory and configured to:
    determine that a first set of the memory cells is to be accessed by a first tenant through a memory control circuitry by signals from a first tenant portal, the first set of the memory cells being different from the system memory, wherein the first set of memory cells further comprises at least one subset of memory cells;
    determine a relationship between the first tenant and the second tenant;
    cause, in response to a determination that the relationship between the first tenant and the second tenant portal is a specific relationship, the memory control circuitry to be configured so that the subset, of the first set of the memory cells, is to be also accessed by the second tenant through the memory control circuitry by signals from the second tenant portal;
    determine a relationship between the first tenant and the third tenant; and
    cause, in response to a determination that the relationship between the first tenant and the third tenant is the specific relationship, the memory control circuitry to be configured so that the subset, of the first set of the memory cells, is to be also accessed by the third tenant through the memory control circuitry by signals from the third tenant portal.

13. The system of claim 12, wherein the memory cells are within a multi-tenant database.

14. The system of claim 13, wherein the multi-tenant database comprises the first set of the memory cells and a second set of the memory cells,
  the second set of memory cells being different from the system memory,
  the first set of the memory cells and the second set of the memory cells being disjoint,
  the first set of the memory cells configured to store a first set of records,
  the second set of the memory cells configured to store a second set of records,
  fields of the first set of records having corresponding fields of the second set of records,
  a field of the fields of the first set of records being a custom field,
  a corresponding field of the corresponding fields of the second set of records being a corresponding custom field,
  the custom field of the first set of records designated to store a first type of data, and
  the corresponding custom field of the second set of records being designated to store a second type of data.

15. A method for controlling access to memory cells, the method comprising:
  controlling, by a processor, a set of the memory cells is to be accessed by a first tenant through the memory control circuitry by signals from a first tenant portal, the set of memory cells further comprise a first subset and a second subset of memory cells;
  determining, by the processor, a relationship between the first tenant and the second tenant;
  causing, by the processor in response to a determination that the relationship between the first tenant and the second tenant is a first relationship, the memory control circuitry to be configured so that the first subset, of the set of the memory cells, is to be also accessed by the second tenant through the memory control circuitry by signals from the second tenant portal;
  determining, by the processor, a relationship between the first tenant and the third tenant; and
  causing, by the processor in response to a determination that the relationship between the first tenant and the third tenant portal is a second relationship, the memory control circuitry to be configured so that the second subset, of the set of the memory cells, is to be also accessed by the third tenant through the memory control circuitry also by signals from the third tenant portal.

16. A non-transitory computer-readable medium storing computer code for controlling access to memory cells, the computer code including instructions to cause the processor to:
  control a set of the memory cells is to be accessed by a first tenant through a memory control circuitry by signals from a first tenant portal, the set of memory cells further comprises a first subset and a second subset of memory cells;
  determine a relationship between the first tenant and the tenant second;
  cause, in response to a determination that the relationship between the first tenant and the second tenant portal is a first relationship, the memory control circuitry to be configured so that the first subset, of the set, is to be also accessed by the second tenant through the memory control circuitry also by signals from the second tenant portal;
  determine a relationship between the first tenant and the third tenant; and
  cause, in response to a determination that the relationship between the first tenant and the third tenant is a second relationship, the memory control circuitry to be configured so that the second subset, of the set of the memory cells, is to be also accessed by the third tenant through the memory control circuitry also by signals from the third tenant portal.

17. A system for controlling access to memory cells, the system comprising:
a system memory; and
a processor coupled to the system memory and configured to:
control a set of the memory cells to be accessed by a first tenant through the memory control circuitry by signals from a first tenant portal, the set of the memory cells being different from the system memory, the set of memory cells further comprises a first subset and a second subset of memory cells;
determine a relationship between the first tenant and the second tenant;
cause, in response to a determination that the relationship between the first tenant and the second tenant portal is a first relationship, the memory control circuitry to be configured so that the first subset, of the set of the memory cells, is to be also accessed by the second tenant through the memory control circuitry by signals from the second tenant portal;
determine a relationship between the first tenant and the third tenant; and
cause, in response to a determination that the relationship between the first tenant the third tenant is a second relationship, the memory control circuitry to be configured so that the second subset, of the set, is to be also accessed by the third tenant through the memory control circuitry by signals from the third tenant portal.

18. A method for controlling access to memory cells, the method comprising:
control, by a processor, a first set of the memory cells is set to be accessed by the first tenant through the memory control circuitry by signals from a first tenant portal, wherein the first set of memory cells further comprises at least one subset of memory cells;
determining, by the processor, a relationship between the first tenant and the second tenant;
causing, by the processor in response to a determination of the relationship between the first tenant and the second tenant, the memory control circuitry to be configured so that the subset, of the first set of memory cells, is to be also accessed by the second tenant through the memory control circuitry by signals from the second tenant portal;
controlling, by the processor, a second set of the memory cells to be accessed by the second tenant through the memory control circuitry by the signals from the second tenant portal, the second set of memory cells further comprises at least one subset of memory cells;
determining, by the processor, a second relationship between the first tenant portal and the second tenant portal; and
causing, by the processor in response to a determination of the second relationship of the first tenant portal, the memory control circuitry to be configured so that the subset, of the second set of the memory cells, is to be also accessed by the first tenant through the memory control circuitry by the signals from the first tenant portal.

19. A non-transitory computer-readable medium storing computer code for controlling access to memory cells, the computer code including instructions to cause the processor to:
control a first set of the memory cells is set to be accessed by a first tenant through the memory control circuitry by signals from a first tenant portal, wherein the first set of memory cells further comprises at least one subset of memory cells;
determine a relationship between the first tenant and the second tenant;
cause, in response to a determination of the relationship between the first tenant and the second tenant, the memory control circuitry to be configured so that the subset, of the first set of the memory cells, is to be also accessed by the second tenant through the memory control circuitry by signals from the second tenant portal;
control a second set of the memory cells to be accessed by the second tenant through the memory control circuitry by the signals from the second tenant portal, the second set of memory cells further comprise at least one subset of memory cells;
determine a second relationship between the first tenant and the second tenant;
cause, in response to the determination of the second relationship between the first tenant and the second tenant, the memory control circuitry to be configured so that the subset, of the second set of memory cells, is to be also accessed by the first tenant through the memory control circuitry by the signals from the first tenant portal.

20. A system for controlling access to memory cells, the system comprising:
a system memory; and
a processor coupled to the system memory and configured to:
control a first set of the memory cells to be accessed by a first tenant through the memory control circuitry by signals from a first tenant portal, the first set of the memory cells being different from the system memory, the first set of memory cells further comprise at least one subset of memory cells;
determine a relationship between the first tenant and the second tenant;
cause, in response to a determination of the relationship between the first tenant and the second tenant, the memory control circuitry to be configured so that the subset, of the first set of memory cells, is to be also accessed by the second tenant through the memory control circuitry by signals from the second tenant portal;
control a second set of the memory cells to be accessed by the second tenant through the memory control circuitry by the signals from the second tenant portal, the second set of the memory cells being different from the system memory, the second set of memory cells further comprise at least one subset of memory cells;
determine a second relationship between the first tenant and the second tenant;
cause, in response to the determination of the second relationship between the first tenant and the second tenant, the memory control circuitry to be configured so that the subset, of the second set of the memory cells, is to be also accessed by the first tenant through the memory control circuitry also by the signals from the first tenant portal.

* * * * *